United States Patent Office 2,732,355
Patented Jan. 24, 1956

2,732,355

WET INK FINISHING VARNISH COMPRISING AN OIL-ALKYD, A LIQUID HALOGENATED AROMATIC HYDROCARBON AND A POLYMETHYL SILICONE

Jerome A. Ryan, Cleveland, Ohio, assignor to The Sherwin-Williams Company, Cleveland, Ohio, a corporation of Ohio No Drawing. Application July 23, 1952,
Serial No. 300,521

12 Claims. (Cl. 260—22)

This invention relates to the metal decorating art and more particularly, as indicated, to a composition for use as a finish varnish over wet inks, and to a method for finish varnishing wet inks applied to a painted surface.

It is frequently desirable to imprint coated metal sheets, such as are used in tin can manufacture, for purposes of identification of the contents. In general, the process involves the application of a white or other base coat to sheet metal, such as black iron or tin plate. The coated sheet is then dried, as by baking, after which it is imprinted with the desired lettering or other indicia. Former techniques allowed for drying the ink, after which the coated, imprinted sheet was varnished, dried, and stacked for subsequent use in making containers. Later developments provided for the elimination of the ink drying step immediately resulting in a problem due to bleeding and spreading of the wet ink at the interface and into the varnish film.

It is a principal object of this invention, therefore, to provide an improved varnish for application over wet ink imprinted surfaces, which varnish has the characteristics inhibiting bleeding or spreading of the wet ink.

Also in operations of the kind described, the imprinted, varnished dried sheets are stacked in piles that may reach two or three feet in height. Thus there is required a varnish which is able within the relatively short time after drying to withstand a relatively high pressure without becoming bonded to the adjacent sheet.

It is another object of this invention, therefore, to provide a varnish which will not result in sticking between adjacent coating sheets when the same are subjected to a relatively high pressure due to the accumulated weight of the stacked imprinted sheets.

Still another problem arises through trade sales. The trade demands a product which has a relatively high gloss as well as a slippery feeling. Still another object of this invention, therefore, is to fulfill these requirements in compositions of this invention.

Another object of this invention is to provide an improved method of coating over freshly inked baked enamel surfaces.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that ordinary clear alkyd type varnish may be converted to a product useful for covering wet inks in the manner aforesaid by the addition thereto of minor amounts of a normally liquid halogenated aromatic hydrocarbon, and a silicone polymer. Improvements in still other respects may be secured by adding a wax in solution in a hydrocarbon to the alkyd varnish already containing the two essential ingredients above mentioned. The usual heavy metal driers such as lead, cobalt and/or manganese, and solvents comprise the balance of the preferred compositions in accordance herewith.

Broadly stated, therefore, this invention is in the provision of a metal decorating wet ink finishing varnish which comprises an alkyd resin carried in a petroleum hydrocarbon solvent, a minor amount of a normally liquid halogenated aromatic hydrocarbon, and a minor amount of a polymeric silicone, for example, polymethyl silicone having a viscosity of 100 centistokes.

The alkyd resin forming the principal film-forming ingredient of the compositions of this invention may be any of the oil-modified alkyd resins which are, as is well known, produced from a polybasic acid such as phthalic anhydride, maleic anhydride, etc.; a polyhydric alcohol such as glycerine, pentaerythritol, sorbitol, mannitol, and the like, and modified with a drying or semi-drying oil such as linseed oil, dehydrated castor oil, soya bean oil, safflower oil, perilla oil, wood oil, sardine oil, cottonseed oil, and the like. Mixtures of various alkyds may also be employed as the essential film-forming ingredients of these compositions. These resins are available as solutions in ordinary solvents, e. g., mineral spirits, in concentrations of from about 50% to about 70% solids.

Oleoresinous varnishes may also be used in these compositions as replacement for part or all of the alkyd varnishes. However, on baking, the oleoresinous varnishes will tend to become discolored thereby rendering the final product less desirable than the clear, heat stable varnishes preferably employed herein.

As indicated above, the heavy metal salts of high molecular weight aliphatic acids such as lead naphthenate, cobalt naphthenate, manganese naphthenate, lead oleate, lead stearate, cobalt oleate, manganese linoleate, lead tallate, cobalt tallate, manganese tallate, and mixtures of such driers may be added to accelerate drying in the usual manner.

The usual solvents may be employed in these compositions. Such solvents include mineral spirits, petroleum naphthas, and various other petroleum hydrocarbon solvents.

It will be seen, therefore, that up to this point the varnishes forming the base of the composition of this invention are ordinary clear alkyd type varnishes containing a resin, a solvent, and, if desired, a drier.

It has been found that such clear varnishes otherwise untreated are unsuited for use as a coating composition to be applied over a wet ink surface because of the very pronounced tendency of the ink to bleed and spread at the interface between the ink surface and the applied coating. The degree of such spreading and bleeding is such as to obliterate, for all practical purposes, the outline of any printed matter or other indicia that it may be desired to apply to the coated metal surface.

It has been found that by adding a normally liquid halogenated aromatic hydrocarbon in combination with a very minor amount, on the order of from .001% to about .2% by weight of the entire composition of a soluble, polymethyl silicone provides a composition which substantially completely inhibits the bleeding and spreading tendency of wet inks over which an alkyd varnish is applied. As indicated above, also, the further addition of a small amount of a wax soluble in mineral spirits, for example, improves the character of the final product by imparting thereto a slippery surface. The amount of such wax, for example, paraffin wax, is somewhat critical since an excessive amount thereof has been found to decrease the gloss which is also a desirable characteristic of the final product.

The normally liquid halogenated aromatic hydrocarbons which are useful in accordance with this invention desirably have boiling points in excess of 200° C. Specific examples of materials suitable for use in this regard include 3,3'-dichlorodiphenyl, liquid chlorinated diphenyls, alpha-chlornaphthalene, orthochlorodiphenyl, and the corresponding fluorine compounds. Dibromobenzene (ortho and meta), alpha naphthalene iodide, tolyl iodide (ortho and meta), and the like.

As to the silicone component hereof, it has been found that the polymethyl silicone compounds having the formula $[-(CH_3)_2Si-O-]_x$, where $x$ is an integer greater than 2, may be used to great advantage. The compounds are colorless oils and are formed by the hydrolysis of dimethyl dichlorosilane. Specific details as to the preparation of and properties of the polymethyl silicones may be found by reference to the patent art and also to Rochow, Chemistry of the Silicones, Wiley, 1951. Compounds having the above formula are referred to hereinafter and in the appended claims as polymethyl silicones.

It has been further found that if the viscosity of the polymeric methyl silicone exceeds about 150 c. s., the polymer is insoluble even in the small amounts normally employed herein. Therefore, the polymers should have a viscosity of less than about 150 c. s.

When it is desired to include a wax in these compositions for the purpose of producing a slippery feel to the dried coating compositions, any wax which is soluble in mineral spirits or other such petroleum hydrocarbon solvent may be employed. The principal wax is paraffin wax as obtained from petroleum refining processes having a melting point from about 100 to about 150° F. and particularly paraffin wax having a melting point from 134 to 138° F. Carnauba wax may also be employed for this purpose.

It becomes convenient at this point to illustrate preferred compositions in accordance with this invention by specific example, such specific examples being intended to illustrate the mode of compounding the compositions of this invention without limiting the scope of the invention to the precise compositions shown.

Example I

| | |
|---|---:|
| Soya glyceryl phthalate alkyd _____gals__ | 51.0 |
| Soya pentaerythritol phthalate alkyd_____gals__ | 33.5 |
| Lead naphthenate (10% solution in mineral spirits) _____gals__ | 1.5 |
| Paraffin solution (15% in petroleum naphtha) _____gals__ | 2.0 |
| Polymethyl silicone (100 c. s.)_____lbs__ | 0.4 |
| Chlorinated diphenyl (30 to 35% chlorine)_gals__ | 55.0 |
| Mineral spirits _____gals__ | 1.5 |

This composition had the following characteristics:

| | |
|---|---|
| Non-volatile matter_____ | 51% |
| Body_____ | G (Gardner Holt) |
| Weight per gal_____ | 7.9 |
| Color_____ | 6 (Gardner) |
| Clarity_____ | Complete |
| Flash point_____ | 100 |

This composition when applied to a wet ink imprinted coated metal sheet showed no tendency to bleeding and spreading at the interface between the varnish and the ink surfaces.

Example II

| | Gals. |
|---|---:|
| Linseed glyceryl phthalate_____ | 86.0 |
| Lead naphthenate (10% solution in mineral spirits) _____ | 1.0 |
| Manganese naphthenate (2% in mineral spirits)___ | .5 |
| Cobalt naphthenate (2% in mineral spirits)_____ | .5 |
| Paraffin solution (15% in petroleum naphtha)____ | 2.0 |
| Polymethyl silicone solution (2% in mineral spirits) _____ | 3.0 |
| Chlorinated diphenyl (30 to 35% chlorine)_____ | 5.0 |
| Mineral spirits_____ | 2.0 |

This composition had substantially the same characteristics as mentioned in Example I and likewise showed no tendency to spreading and bleeding when applied to a wet ink imprinted surface.

Example III

| | Gals. |
|---|---:|
| Safflower glyceryl phthalate_____ | 85 |
| Lead naphthenate (10% solution in mineral spirits)_ | 2 |
| Polymethyl silicone solution (2% in mineral spirits)_ | 4 |
| 3,3'-dichlordiphenyl _____ | 6 |
| Mineral spirits_____ | 3 |

Example IV

The composition of Example II was duplicated, substituting, however, for the 86 gals. of linseed glyceryl phthalate, 86 gals. of soya pentaerythritol phthalate.

The foregoing compositions proved to be very satisfactory from the standpoints of the desired objectives of this invention. Example III, however, did not possess quite the desirable slippery feel to the finished film due to the absence of paraffin wax from said composition. Other compositions in accordance with this invention will become obvious to those skilled in the art in view of the disclosure and the specific examples recited above.

This invention also contemplates the method of finish varnishing wet inks which have been previously applied to a coated metal sheet which comprises applying to the imprinted coated metal sheet before the ink has had an opportunity to dry, by spray or brush application, a clear varnish comprising an oil-modified alkyd resin in solution in mineral spirits to which composition has been added from about 4 to about 8% by volume of a normally liquid halogenated aromatic hydrocarbon and from about .001 to about .2% by weight of the entire composition of a polymethyl silicone having a viscosity of from about 75 to about 150 centistokes, and then drying the coating composition thus applied.

This application is a continuation-in-part of my copending application Serial No. 238,025, dated July 21, 1951, now abandoned.

Other modes of applying the principle of this invention may be employed instead of those specifically set forth above, changes being made as regards the details herein disclosed, provided the elements set forth in any of the following claims, or the equivalent of such be employed.

I, therefore, particularly point out and distinctly claim as my invention:

1. A metal decorating wet ink finishing varnish comprising an oil-modified alkyd resin carried in a petroleum hydrocarbon solvent, from about 4% to about 8% by volume of a normally liquid halogenated aromatic hydrocarbon having a boiling point in excess of about 200° C., and from .001% to .2% by weight of the entire composition of a polymethyl silicone having a viscosity of from about 75 to about 150 centistokes.

2. A metal decorating wet ink finishing varnish comprising an oil-modified alkyd resin carried in a petroleum hydrocarbon solvent, from about 4% to about 8% by volume of a normally liquid halogenated aromatic hydrocarbon containing from about 30 to 35% by weight of halogen having a boiling point in excess of about 200° C., and from .001% to .2% by weight of the entire composition of a polymethyl silicone having a viscosity of from about 75 to about 150 centistokes.

3. A composition in accordance with claim 1 in which the normally liquid halogenated aromatic hydrocarbon is a halogenated diphenyl containing from about 30 to about 35% by weight of halogen.

4. A composition in accordance with claim 1 in which the normally liquid halogenated aromatic hydrocarbon is a normally liquid chlorinated aromatic hydrocarbon.

5. A composition in accordance with claim 1 in which the normally liquid halogenated aromatic hydrocarbon is chlorinated diphenyl containing from about 30 to 35% chlorine.

6. A composition in accordance with claim 1 in which the normally liquid halogenated aromatic hydrocarbon is 3,3'-dichlordiphenyl.

7. A composition in accordance with claim 1 in which the alkyd resin is an oil-modified alkyd resin, the oil employed in modifying said resin being selected from the group consisting of drying oils and semi-drying oils.

8. A composition in accordance with claim 1 in which the oil-modified alkyd resin is a soya bean modified alkyd resin.

9. A composition in accordance with claim 1 in which the oil-modified alkyd resin is a soya bean modified glyceryl phthalate.

10. A composition in accordance with claim 1 in which the oil-modified alkyd resin is a soya bean modified glyceryl phthalate, and the normally liquid halogenated aromatic hydrocarbon is a chlorinated diphenyl containing from about 30% to about 35% by weight of chlorine.

11. A composition in accordance with claim 1 which is additionally characterized by the presence therein of from about .5 to about 3% by weight of paraffin wax.

12. A method of finish varnishing wet inks which includes the steps of applying to the surface of a freshly ink imprinted coated metal surface a clear varnish comprising an oil-modified alkyd resin carried in a petroleum hydrocarbon solvent, from about 4% to about 8% by volume of a liquid halogenated aromatic hydrocarbon, and from about .001% to about .2% by weight of the entire composition of a polymethyl silicone having a viscosity of from about 75 to about 150 centistokes, and then drying the coated metal sheet.

References Cited in the file of this patent

UNITED STATES PATENTS

| | | |
|---|---|---|
| 2,111,802 | Oswald | Mar. 22, 1938 |
| 2,220,621 | Ellis | Nov. 5, 1940 |
| 2,523,065 | Sage | Sept. 19, 1950 |
| 2,587,295 | Doyle et al. | Feb. 26, 1952 |